(12) United States Patent
Cools

(10) Patent No.: US 10,850,219 B2
(45) Date of Patent: *Dec. 1, 2020

(54) LIQUID SEPARATOR

(71) Applicant: ATLAS COPCO AIRPOWER, NAAMLOZE VENNOOTSCHAP, Wilrijk (BE)

(72) Inventor: Ronny Cools, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 119 days.

This patent is subject to a terminal disclaimer.

(21) Appl. No.: 16/282,850

(22) Filed: Feb. 22, 2019

(65) Prior Publication Data
US 2019/0184322 A1 Jun. 20, 2019

Related U.S. Application Data

(63) Continuation of application No. 15/026,738, filed as application No. PCT/BE2014/000052 on Oct. 2, 2014, now Pat. No. 10,213,720.
(Continued)

(30) Foreign Application Priority Data

Sep. 29, 2014 (BE) .................................. 2014/0657

(51) Int. Cl.
*B01D 9/00* (2006.01)
*B01D 46/00* (2006.01)
(Continued)

(52) U.S. Cl.
CPC ...... *B01D 46/0005* (2013.01); *B01D 46/2411* (2013.01); *B01D 50/002* (2013.01);
(Continued)

(58) Field of Classification Search
CPC ............ B01D 46/0005; B01D 46/2411; B01D 50/002; B01D 46/0004; B01D 27/005;
(Continued)

(56) References Cited

U.S. PATENT DOCUMENTS 3,289,397 A 12/1966 Schonewald et al.
3,577,705 A * 5/1971 Sharlit ............... B01D 46/0067
95/2

(Continued)

FOREIGN PATENT DOCUMENTS

BE 1018543 A3 3/2011
CN 101073727 A 11/2007
(Continued)

OTHER PUBLICATIONS

International Preliminary Report on Patentability from PCT Application No. PCT/BE2014/000052, dated Feb. 11, 2016.
(Continued)

*Primary Examiner* — Dung H Bui
(74) *Attorney, Agent, or Firm* — Workman Nydegger

(57) ABSTRACT

A liquid separator comprises a vessel with an inlet for a liquid/gas mixture. The vessel defines a space sealed at the top by means of a lid in which is situated an outlet to discharge treated gas. A shield is provided in the space extending around the outlet as of the lid, and a filter element provided within the shield. An outlet zone is defined between the shield and the filter element, wherein the outlet zone is in connection with the outlet. The shield comprises a bottom wall with at least one inlet opening and connection means for attaching the filter element onto the bottom wall. The connection means is configured such that the filter element, in a mounted condition, extends around the inlet opening as from the bottom wall, within a chamber defined by the shield, the lid and the bottom wall.

15 Claims, 5 Drawing Sheets

Related U.S. Application Data

(60) Provisional application No. 61/886,233, filed on Oct. 3, 2013.

(51) Int. Cl.

| | | |
|---|---|---|
| *B01D 46/24* | (2006.01) | |
| *B01D 50/00* | (2006.01) | |
| *F01D 11/00* | (2006.01) | |
| *F01D 25/04* | (2006.01) | |
| *B01D 27/00* | (2006.01) | |
| *F01D 9/04* | (2006.01) | |

(52) U.S. Cl.
CPC .......... *F01D 11/001* (2013.01); *F01D 11/005* (2013.01); *F01D 25/04* (2013.01); *B01D 27/005* (2013.01); *B01D 46/001* (2013.01); *B01D 46/002* (2013.01); *B01D 46/0004* (2013.01); *B01D 2265/00* (2013.01); *B01D 2265/024* (2013.01); *B01D 2265/025* (2013.01); *B01D 2265/028* (2013.01); *F01D 9/041* (2013.01)

(58) Field of Classification Search
CPC ............ B01D 46/002; B01D 2265/028; B01D 46/001; B01D 2265/00; B01D 2265/024; B01D 2265/025; F01D 11/001; F01D 11/005; F01D 25/04; F01D 9/041
See application file for complete search history.

(56) References Cited

U.S. PATENT DOCUMENTS

| | | | | |
|---|---|---|---|---|
| 3,653,188 A * | 4/1972 | Fisher | ................ | B01D 46/0067 55/283 |
| 4,344,781 A * | 8/1982 | Higgins | ................. | B01D 46/02 383/119 |
| 4,398,931 A * | 8/1983 | Shevlin | ................ | B01D 39/086 210/497.1 |
| 4,637,473 A * | 1/1987 | Gillis | ..................... | A62C 37/00 169/61 |
| 4,854,953 A | 8/1989 | Van Weerden et al. | | |
| 5,205,850 A * | 4/1993 | Jenrich | .............. | B01D 46/0005 55/350.1 |
| 5,752,999 A * | 5/1998 | Newby | ................ | B01D 46/002 55/350.1 |
| 6,017,379 A | 1/2000 | Kauffman | | |
| 6,036,751 A * | 3/2000 | Ribardi | .............. | B01D 46/0068 220/203.01 |
| 6,086,763 A * | 7/2000 | Baumann | ............... | B01D 29/111 210/497.01 |
| 6,436,162 B1 | 8/2002 | Wake et al. | | |
| 6,471,751 B1 | 10/2002 | Semanderes et al. | | |
| 8,147,575 B2 * | 4/2012 | Lucas | .................... | B01D 45/12 55/337 |
| 8,167,981 B2 * | 5/2012 | Webb | ..................... | B01D 46/42 95/282 |
| 8,409,311 B2 * | 4/2013 | Jessberger | ......... | B01D 46/0012 55/385.3 |
| 8,945,257 B2 | 2/2015 | Moens | | |
| 9,034,066 B2 * | 5/2015 | Brown | ................... | B01D 45/16 55/337 |
| 9,314,724 B2 | 4/2016 | Girondi | | |
| 10,323,606 B2 * | 6/2019 | Wilson | .................... | F02B 47/02 |
| 2006/0081528 A1 * | 4/2006 | Oelpke | ................ | B01D 46/527 210/493.1 |
| 2007/0284301 A1 * | 12/2007 | Dworatzek | ........ | B01D 46/2411 210/455 |
| 2008/0314248 A1 | 12/2008 | Peteln | | |
| 2009/0078626 A1 | 3/2009 | Krull et al. | | |
| 2009/0242470 A1 | 10/2009 | Muenkel et al. | | |
| 2011/0315018 A1 | 12/2011 | Moens | | |
| 2012/0152199 A1 | 6/2012 | Thienel | | |
| 2012/0317939 A1 | 12/2012 | Kaufmann et al. | | |
| 2014/0150388 A1 | 6/2014 | Girondi | | |
| 2016/0236127 A1 | 8/2016 | Cools | | |

FOREIGN PATENT DOCUMENTS

| | | |
|---|---|---|
| CN | 201346419 Y | 11/2009 |
| CN | 101972562 A | 2/2011 |
| CN | 102292135 A | 12/2011 |
| CN | 204709873 U | 10/2015 |
| EP | 0148359 A1 | 7/1985 |
| FR | 2127360 A5 | 10/1972 |
| WO | 2003080221 A1 | 10/2003 |
| WO | 2005049177 A1 | 6/2005 |

OTHER PUBLICATIONS

International Search Report from PCT Application No. PCT/BE2014/000052, dated Apr. 10, 2015.

Chinese Office Action from CN Application No. 201410729600.1, dated Jun. 12, 2016.

* cited by examiner

LIQUID SEPARATOR

BACKGROUND

The present invention relates to a liquid separator.

More specifically, the invention relates to a liquid separator comprising a vessel with an inlet for a liquid/gas mixture and whereby this vessel also defines a space which is sealed at the top by means of a lid in which is situated an outlet to discharge treated gas, whereby in the above-mentioned space, a shield is provided extending around the above-mentioned outlet as of the above-mentioned lid, and a filter element provided within said shield, such that an outlet zone is defined between the shield and the filter element.

An existing type of liquid separator is described in the Belgian patent No. 1,018,543, whereby said shield is realized in the shape of a pipe extending around said outlet as from said lid.

Upon entry of the liquid/gas mixture via said inlet into the vessel, the liquid pre-separation takes place, typically by cyclonic flow of the liquid/gas mixture between the vessel wall and said shield inside the vessel. Advantageously, but not necessarily, one or both of said vessel wall and said shield are cylindrically shaped.

The liquid/gas mixture might for example be an oil/air mixture coming from the outlet of an oil injected compressor.

A further separation takes place by means of said filter element that is positioned within the shield, in case of BE 1,018,543 around said outlet.

A drawback of the known set-up is the limited flexibility. Generally the design is made for the greatest flow and is oversized for smaller flows.

The liquid that passes through the liquid separator filter element is usually collected in a reservoir and scavenged out of the liquid separator by means of a tube, also known as the 'scavenge line'.

A disadvantage of such tube is that it is sensitive to deformation during assembly which can have adverse effect on the scavenge principle and hence result in contamination of the discharge with liquid.

SUMMARY

The present invention aims at providing an improved liquid separator that overcomes one or more of the above disadvantages.

To this aim, the invention concerns a liquid separator comprising a vessel with an inlet for a liquid/gas mixture whereby this vessel defines a space which is sealed at the top by means of a lid in which is situated an outlet to discharge treated gas, whereby in the above-mentioned space, a shield is provided extending around the above-mentioned outlet as of the above-mentioned lid, and a filter element is provided within said shield, such that an outlet zone is defined between the shield and the filter element, wherein said outlet zone is in connection with said outlet and wherein said shield comprises a bottom wall with at least one inlet opening and connection means for attaching said filter element onto said bottom wall, said connection means being configured such that said filter element, in a mounted condition, extends around said inlet opening as from the bottom wall, within the chamber defined by said shield, said lid and said bottom wall.

An advantage of a liquid separator according to the invention is that the shield is directly the support for the filter element.

This means that no separate support for the filter element needs to be provided.

Since the connection means for the filter element make either or not an integral part of in the shield, this provides also the flexibility to easily adapt the number of filter elements depending on the expected flow through the liquid separator.

Preferably said connection means are configured as reversible connection means so as to allow disconnecting the filter element from the bottom wall.

This will allow and facilitate the removal of the filter element in case it needs replacement.

According to a preferred characteristic of the invention, the above-mentioned bottom wall forms an integral part with said shield. Also said lid can be made integral with said shield.

An advantage thereof is that less seals need to be used and the assembly of the liquid separator is easier.

In a specific embodiment of a liquid separator according to the invention, said bottom wall is provided with two or more inlet openings, each inlet opening being associated with connection means allowing the mounting of a filter element.

In this way, several filter elements can be placed and secured in the liquid separator.

Said connection means preferably consist of a snap-in connection. Said connection means can comprise a male part and a female part configured to co-operate, one of said parts being provided on said bottom wall and the other part being provided on a connector body of said filter element.

According to a specific form of embodiment, said male part is provided on an inner periphery of a protruding wall extending as from the bottom wall around said inlet opening, while said female part is provided on the outer periphery of a connector body of said filter element. Preferably, said connection means are configured as reversible connection means so as to allow to activate the connection between the filter element and the bottom wall by rotation of said filter element relative to said bottom wall.

The connection of the filter element is optimized for assembly by means of the male part provided in the shield and the female part in the connector body of the filter element.

The connector body of the filter element holds the filter material and ensures the connection of this filter material to the bottom wall.

The design of these connection means is made as such that it is easy to insert the connector body of the filter element, which is also called cartridge, in the protruding wall of the shield and by rotating preferably less than half a turn, the filter element is locked in position.

An advantage of this connection system is rapid assembly and servicing and also secure positioning and sealing of the cartridge.

The invention also relates to a filter element that can be used in a liquid separator according to the invention.

BRIEF DESCRIPTION OF THE DRAWINGS

In order to better explain the characteristics of the invention, hereafter, by way of example, some preferred embodiments of a liquid separator according to the invention are described, without being limitative in any way, whereby.

DETAILED DESCRIPTION OF VARIOUS EMBODIMENTS

A preferred embodiment of a liquid separator 1 according to the invention is shown in FIGS. 1 to 9.

Figure 1:
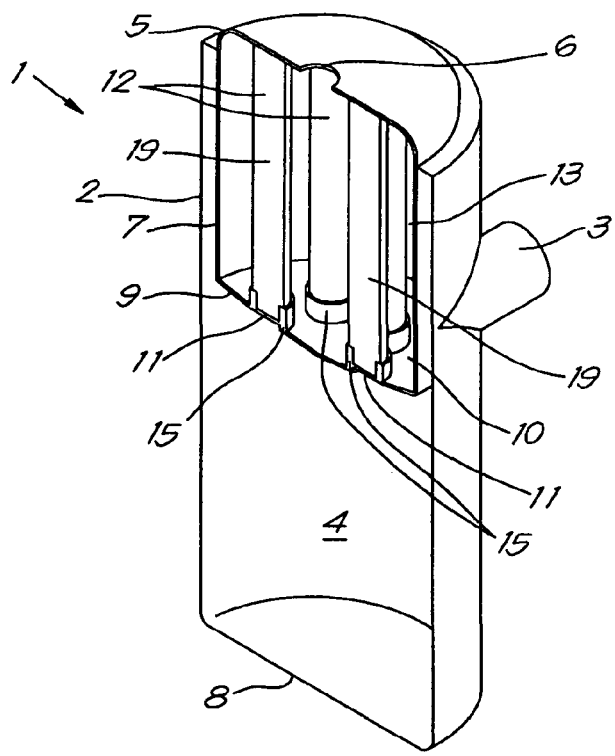
FIG. 1 schematically represents a perspective view of a liquid separator according to the invention, said liquid separator being cut through in order to show the inner configuration thereof.

The liquid separator 1 in FIG. 1 comprises a vessel 2 with an inlet 3 for a liquid/gas mixture.

This liquid/gas mixture might, for example, be a compressed gas flow coming from an oil injected screw compressor.

The vessel 2 defines a space 4 which is sealed at the top by means of a lid 5.

In this lid 5 an opening is provided, which serves as an outlet 6 to discharge treated gas.

In the space 4 defined by the vessel 2 is a so-called shield 7 provided.

This shield 7 extends from the lid 5 up to a distance from the bottom 8 of the vessel.

Moreover, it extends around the outlet 6 for treated gas.

According to the invention, the shield 7 comprises a bottom wall 9, such that a chamber 10 is created within the shield 7 that is defined by the shield 7, the lid 5 and the bottom wall 9.

In this case, but not necessarily, the lid 5 and the bottom wall 9 form an integral part with the shield 7. It is also possible that only the bottom wall 9 forms an integral part with the shield 7.

In the bottom wall 9 at least one inlet opening 11 is provided. Preferably two or more inlet openings 11 are provided. In this case there are six inlet openings 11 provided.

Within the above-mentioned chamber 10, there are some filter elements 12 provided which are attached onto said bottom wall 9 such that they extend around one of the inlet openings 11.

The space between the shield 7 and the filter elements 12 defines an outlet zone 13.

The outlet 6 is in connection with this outlet zone 13, such that treated gas which has entered the chamber 10 and has passed through the filter elements 12, can leave the liquid separator via the outlet 6.

Figure 2:
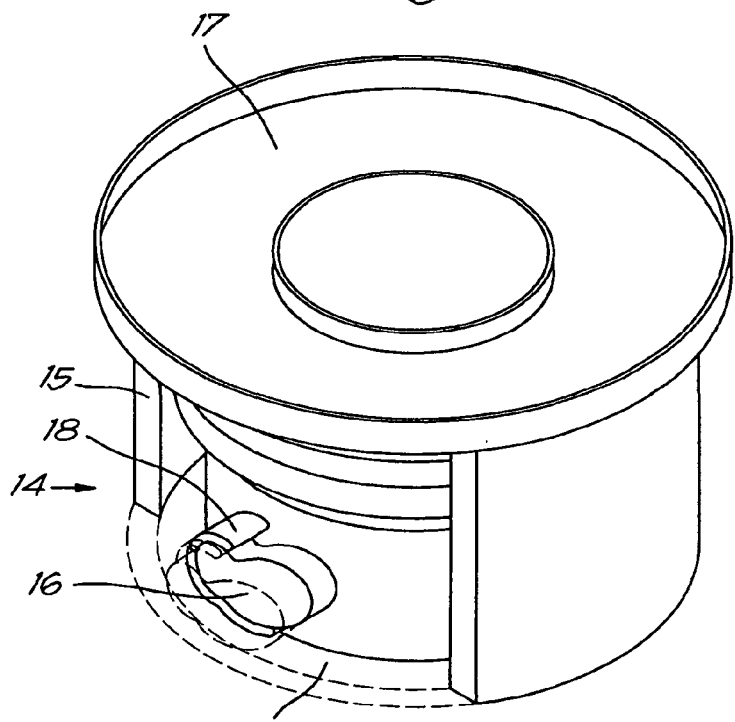
FIG. 2 shows a connector body of a filter element and a connector on the bottom wall of the shield, both said connector body and said connector on the bottom wall making part of a liquid separator according to the invention, with part of the connector body and the connector on the bottom wall being cut away for reasons of clarity.
Figure 3:
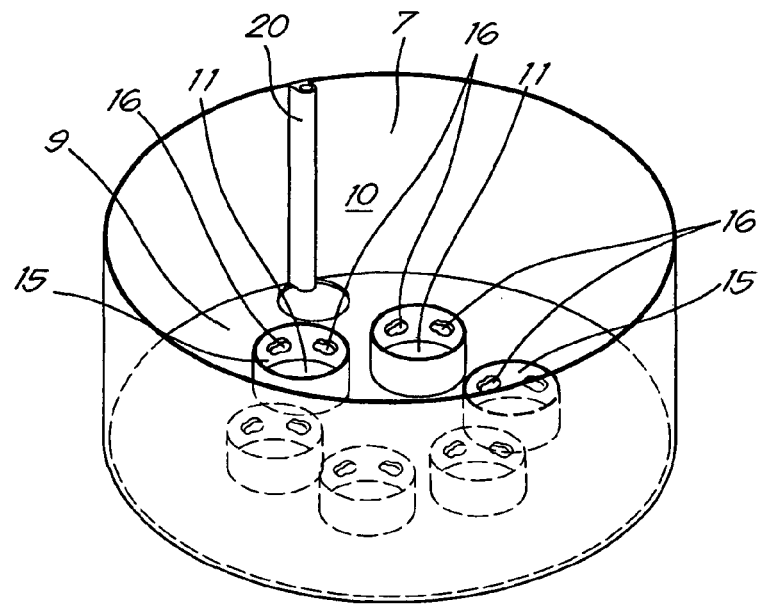
FIG. 3 shows a bottom wall of the shield provided with multiple connection means according to the invention.
Figure 4:
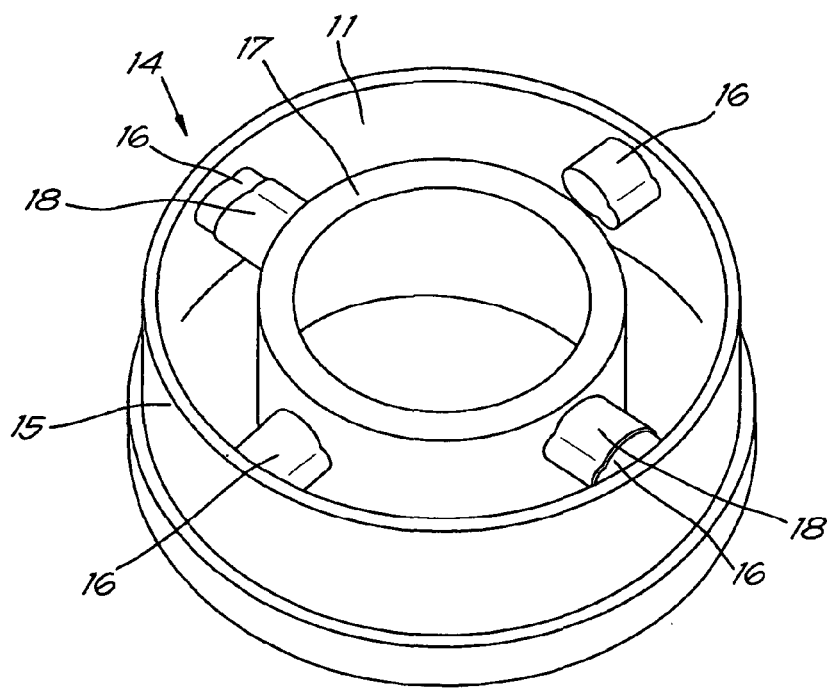
FIG. 4 shows a detail of the connection means in engaged condition.
Figure 5:
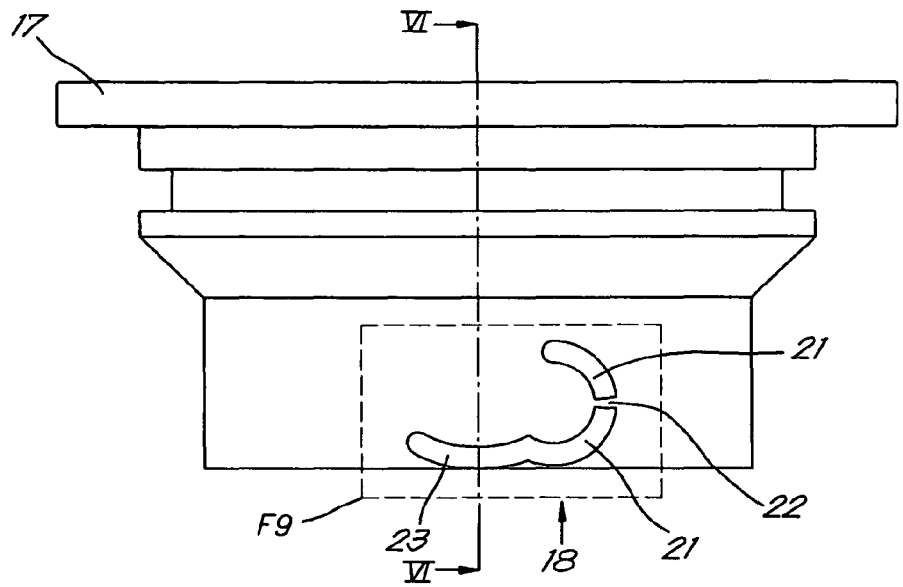
FIG. 5 shows a side view of a connector body of a filter element according to a preferred embodiment of the invention.
Figure 6:
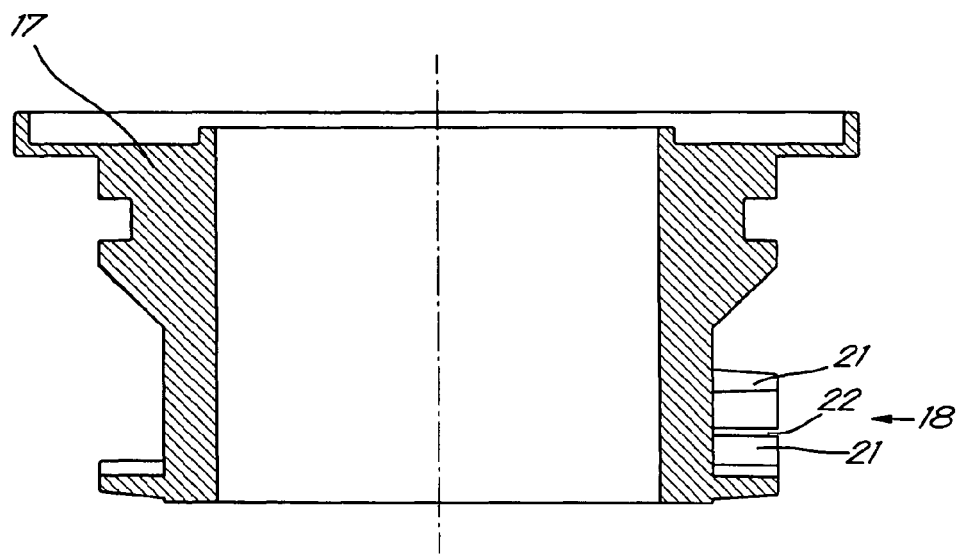
FIG. 6 shows a cross-section according to line VI-VI in FIG. 5.
Figure 7:
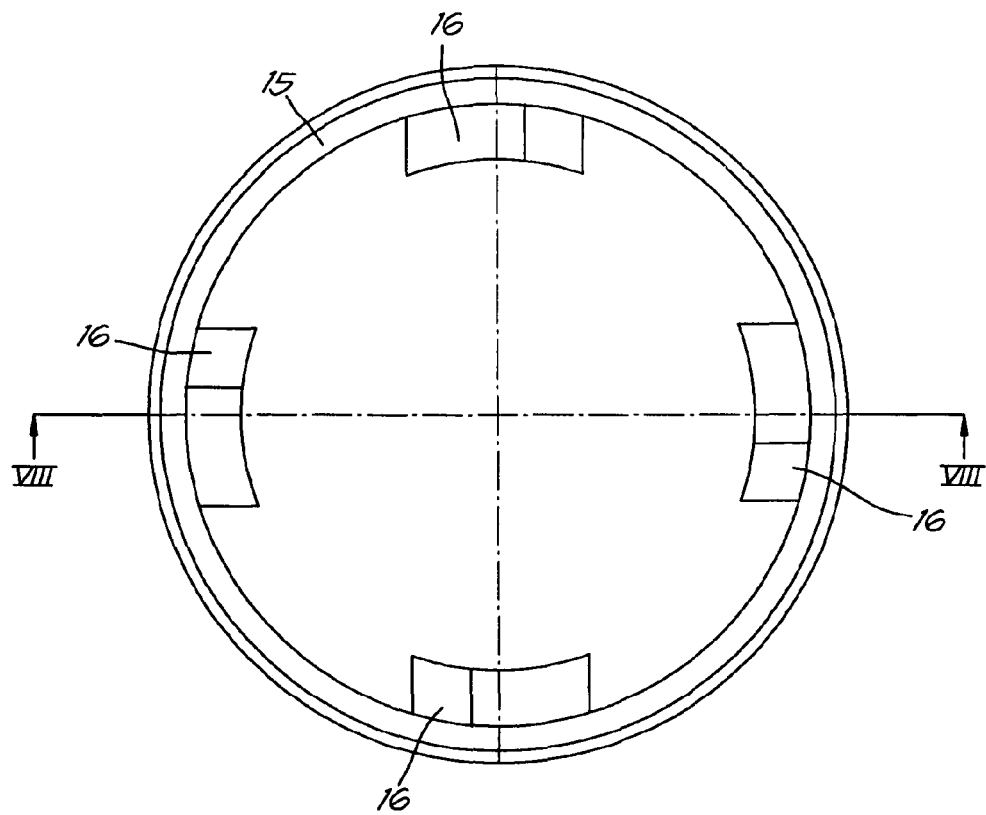
FIG. 7 shows a top view of a connector on the bottom wall.

In order to attach the filter elements 12 to the bottom wall 9, use is made of connection means 14, which are shown in FIGS. 2 to 4.

Each inlet opening 11 is provided with its respective connection means 14 allowing the mounting of one of the filter elements 12.

In this case, the connection means 14 consist of a snap-in connection.

As can be seen in FIG. 3, the bottom wall 9 is provided with protruding walls 15 extending as from the bottom wall 9 around each inlet opening 11.

On the inner periphery of this protruding wall 15, a male part 16 of the connection means 14 is provided. The male part 16 can therefore be called the 'inner connector' of the connecting means 14. As can be seen, in this case four male 16 parts are provided.

The filter element is provided with a connector body 17 as shown in FIG. 2, whereby a female part 18 is provided on a corresponding location on the outer periphery of the connector body 17. The female part can—therefore be called the 'outer connector' of the connecting means. In this case, two female parts 18 are provided.

The connector body 17 holds the filter material 19, i.e. the part of the filter element where the liquid/gas mixture flows through.

FIG. 4 shows the connection means 14 from the underside, where it can be seen how the male parts 16 and female parts 18 engage in one another.

As is clear from this figure, the connection means 14 are configured as reversible connection means 14 so as to allow to activate the connection between the filter element 12 and the bottom wall 9 by rotation of the filter element 12 relative to said bottom wall 9, preferably for less than half a turn. By rotation in the opposite direction, the connection will be deactivated, meaning that the filter element 12 can be disconnected from the bottom wall 9.

It is clear that it is also possible that the male part 16 is provided on the connector body 17 of the filter element 12, while the female part 18 is provided on the protruding wall 15 of the bottom wall 9.

In fact it is even possible that both male parts 16 and female parts 18 are provided on the connector body 17 of the filter element 12, while on the protruding wall 15 the opposite parts 16 or 18 are provided on the corresponding locations.

A scavenge line 20 is preferably integrated directly in the wall of the shield 7 as can be seen in FIG. 3. An advantage of this integrated scavenge line 20 is that it eliminates the use of a tube which is normally used for scavenging the liquid or oil out of the liquid separator 1 and it eliminates the risk of deformation and guarantees optimal position in the liquid or oil bath.

Particular attention should be paid to the details of the connection means 14 as represented for example in FIGS. 5 to 9. In this embodiment, said connection means 14 are mainly shaped as a dovetail connection.

Figure 9:
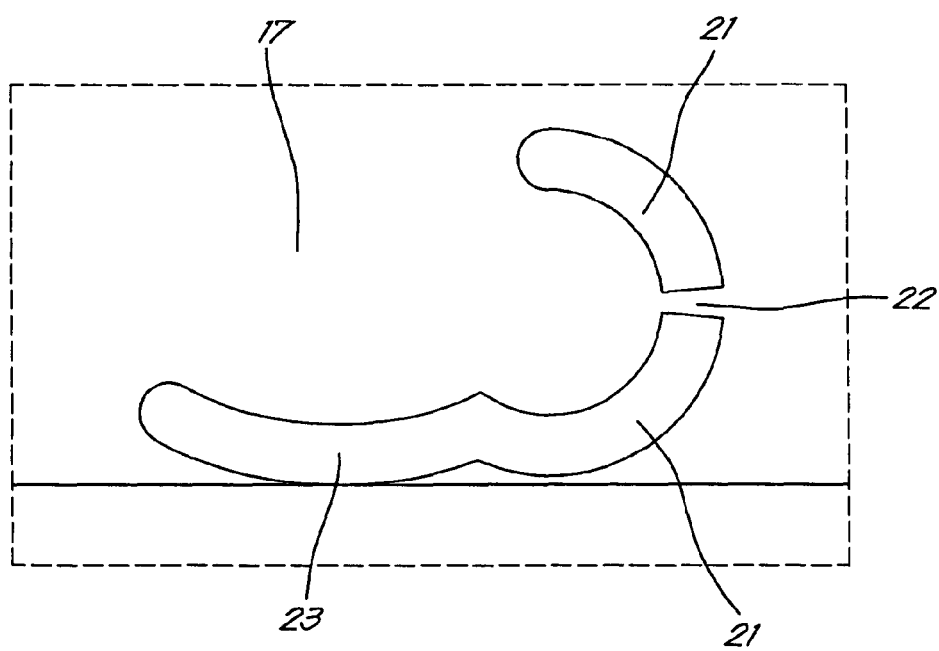
FIG. 9 shows on an enlarged scale the part indicated by E9 on FIG. 5.

Referring to FIG. 9 there is shown an embodiment in which a female part 18 of the connection means 14 comprise two opposing flexible lips 21 protruding from the outer wall of the connector body 17 of the filter element 12.

Together, said lips 21 are arranged so as to form half of a split circle. Due to the presence of a split 22 between the lips 21, relative movement of said lips 21 to one another is possible, allowing engagement with a male part 16 provided, in this case, on the inner periphery of a protruding wall 15 on said bottom wall 9.

One of said lips 21 shows an extended side portion 23 forming a guidance part for said co-operating male part 16 of the connection means 14. As such, the female part 18 of said connection means 14 have the appearance of a hook with a mainly longitudinal section and a mainly circularly bent section following said mainly longitudinal section.

Looking at the drawings it is clear that said mainly longitudinal section does not need to be straight, but can also be slightly curved, in this case so as to show better complementary shape to the outer shape of the male part 16 of the connection means 14.

It is clear however, that it is not necessary that the afore-mentioned split 22 is present. Moreover, it is also not necessary that the extended side portion 23 is present. Indeed, in the most basic embodiment the female part 18 can be one single flexible lip 21 in the form of semicircle that corresponds to at least a part of the outer shape of the male part 16 of the connection means 14.

Figure 8:
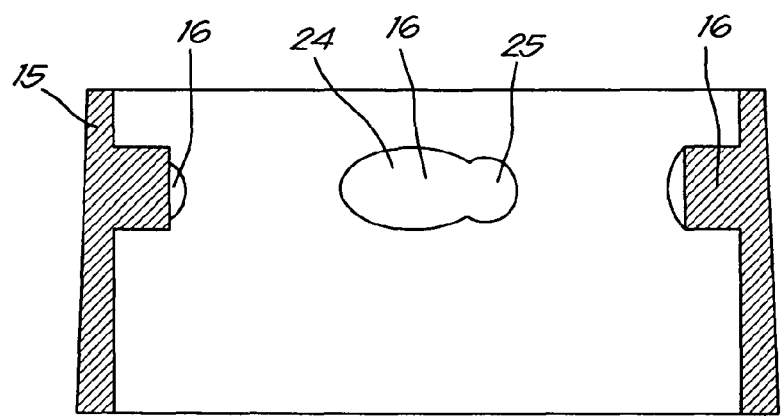
FIG. 8 represents a cross-sectional view of the connector according to line VIII-VIII in FIG. 7.

Said male part 16, in this example shows a fish-shaped portion with a larger elliptical portion 24 and a smaller, circular portion 25, said elliptical and circular portions 24, 25 slightly overlapping as can be seen in FIG. 8.

As is clear from the figures, the connection means 14 are in this example realised in such a way that a snap-in connection is realised, whereby the male part 16 fits tightly and securely in the female part 18.

Obviously the connection means 14 of a liquid separator 1 according to the invention can show many different shapes and the shape described above is thus not limitative to the scope of the invention.

The connection of the filter element 12 is optimized for assembly by means of an inner connector provided in the shield 7, more specifically on the protruding wall 15 and an outer connector in the housing of the filter element 12, more specifically on the connector body 17.

The design of this connection system is made as such that it is easy to insert the filter element 12 in the inner connector of the shield 7 and by rotating less than half a turn, the filter element 12 is locked in position.

The operation of the liquid separator 1 of FIG. 1, is easy and as follows.

An liquid/gas mixture enters the vessel 2 via the inlet 3. A first separation stage takes place by the cyclonic flow of the mixture between the vessel 2 and the shield 7.

In the next stage, the mixture passes through the inlet opening 11 in the bottom wall and through the filter element 12 to enter the outlet zone 13.

When passing through the filter 12, the next separation stage takes place.

The treated gas in the outlet zone 13 leaves the vessel 2 via the outlet 6 in the lid 5.

The liquid which is filtered by the filtered element 12 is collected and scavenged via the integrated scavenge line 20.

The invention is by no way limited to the forms of embodiments described above and shown in the drawings, but a liquid separator and filter element according to the invention can be realized in all kinds of shapes and dimensions, without departure from the scope of the invention.

The invention claimed is:

1. A liquid separator comprising:
   a vessel with an inlet for a liquid/gas mixture, the vessel defining a space that is sealed at the top by a lid, the vessel having an outlet provided in the lid to discharge treated gas,
   wherein the liquid separator further comprises within the space defined by the vessel
   a shield that extends around the outlet, the shield having a sidewall and a bottom wall, the sidewall extending from the lid to the bottom wall to define a chamber between the lid and the bottom wall, and
   a filter element provided within the shield such that an outlet zone is defined between the shield and the filter element;
   wherein the outlet zone is connected with the outlet,
   wherein the bottom wall includes an inlet opening, and a connector is provided at the inlet opening to attach the filter element to the bottom wall, the connector being configured such that the filter element, in a mounted condition, extends around the inlet opening,
   wherein the bottom wall is provided with a protruding wall that extends from the bottom wall around the inlet opening, the protruding wall extending generally perpendicularly from a plane of the bottom wall,
   wherein the protruding wall extends within the chamber,
   wherein the connector includes a snap-in connection including a male part and a female part configured to co-operate, one of the male part and female part being provided on an inner periphery of the protruding wall and the other of the male part and female part being provided on an outer periphery of a connector body of the filter element,
   wherein the male part of the snap-in connection extends in a direction generally perpendicular to a longitudinal axis of the filter element, and
   wherein the male part comprises an elliptical portion and a circular portion, wherein the elliptical portion and the circular portion overlap such that a fish-shaped portion is realized and that the female part comprises at least one flexible lip that is arranged to form a semicircle.

2. The liquid separator according to claim 1, wherein the male part is provided on an inner periphery of the protruding wall and the female part is provided on the outer periphery of a connector body of the filter element.

3. The liquid separator according to claim 1, wherein the circular portion of the male part is smaller than the elliptical portion of the male part.

4. The liquid separator according to claim 1, wherein the female part comprises two flexible lips that are arranged to form half of a split circle, wherein a split is present between the lips.

5. The liquid separator according to claim 4, wherein one of the at least two flexible lips is provided with an extended side portion that forms a guidance part of the male part.

6. The liquid separator according to claim 5, wherein the extended side portion is curved to a shape complementary to the shape of the male part.

7. The liquid separator according to claim 1, wherein the shield is provided with an integrated scavenge line.

8. The liquid separator according to claim 1, wherein the connector is configured so as to facilitate connecting and disconnecting of the filter element from the bottom wall.

9. The liquid separator according to claim 1, wherein the bottom wall forms an integral part with the shield.

10. The liquid separator according to claim 1, wherein the bottom wall is provided with two or more inlet openings, each inlet opening being associated with a connector that allows the mounting of a corresponding filter element.

11. The liquid separator according to claim 1, wherein the connector is a reversible connector that provides connection and disconnection between the filter element and the bottom wall by rotation of the filter element relative to the bottom wall.

12. The liquid separator according to claim 1, wherein the connector is shaped as a dovetail connection.

13. A filter element configured to be used in a liquid separator according to claim 1.

14. The filter element according to claim 13, wherein the filter element comprises a connector body that is provided with a female part configured to co-operate with a male part of the connector, the female part being provided on an outer periphery of the connector body of the filter element so as to co-operate with the male part provided on an inner periphery of a protruding wall that extends from the bottom wall around the inlet opening of the liquid separator.

15. The filter element according to claim 14, wherein the female part of the filter element is configured to co-operate with the male part that extends in a direction generally perpendicular to a longitudinal axis of the filter element.

\* \* \* \* \*